Figure 1:
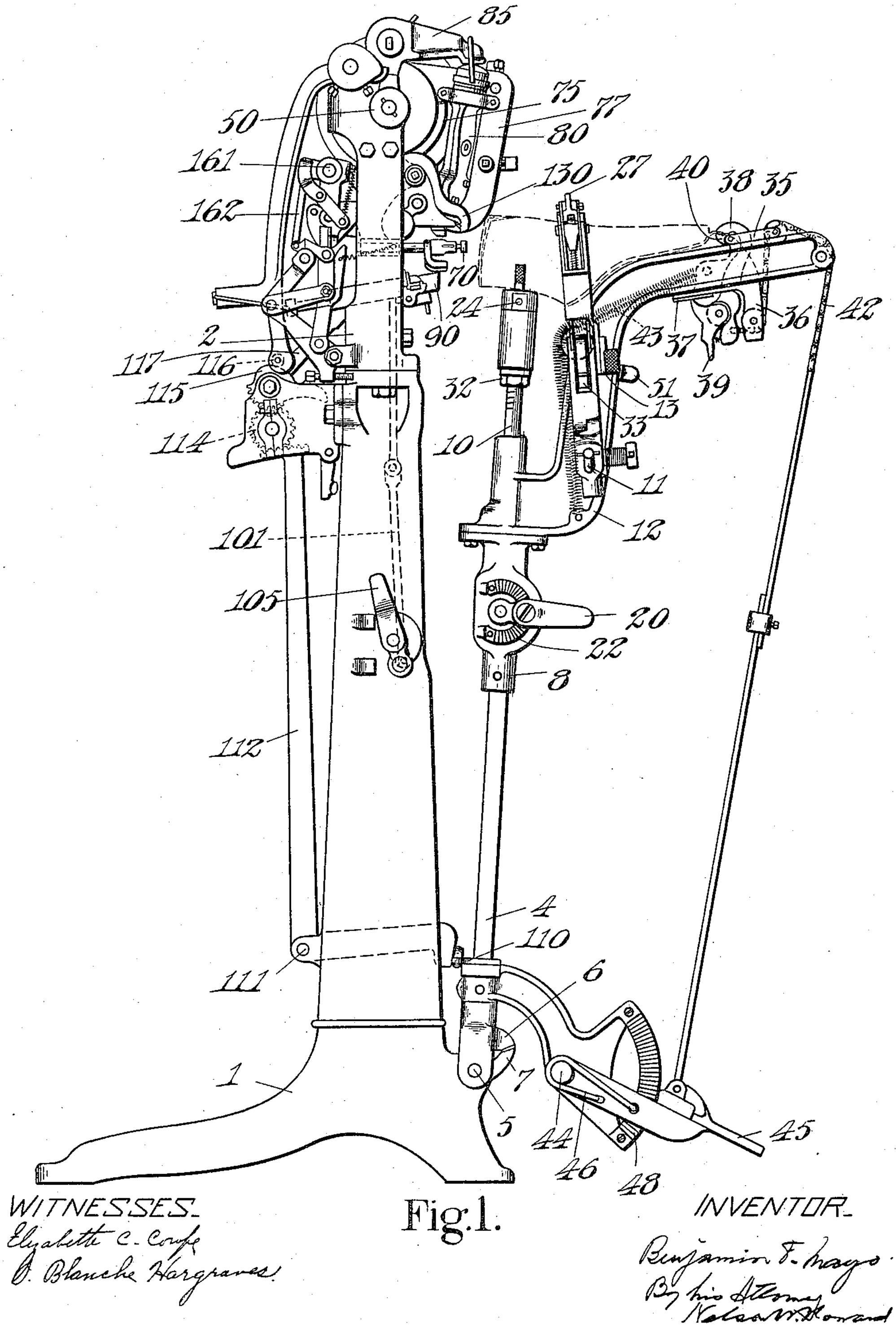

B. F. MAYO.

SHOE ASSEMBLING AND HEEL SEAT LASTING MACHINE.

APPLICATION FILED FEB. 28, 1912.

1,167,913. Patented Jan. 11, 1916.

7 SHEETS—SHEET 1.

WITNESSES-

Elizabeth C. Coupe

O. Blanche Hargraves

INVENTOR-

Benjamin F. Mayo

By his Attorney

Nelson W. Howard

COLUMBIA PLANOGRAPH CO., WASHINGTON, D. C.

B. F. MAYO.

SHOE ASSEMBLING AND HEEL SEAT LASTING MACHINE.

APPLICATION FILED FEB. 28, 1912.

1,167,913.

Patented Jan. 11, 1916.

7 SHEETS—SHEET 2.

WITNESSES:

Elizabeth C. Coupe

J. Blanche Hargraves

INVENTOR

Benjamin F. Mayo

By his Attorney,

Nelson W. Howard

COLUMBIA PLANOGRAPH CO., WASHINGTON, D. C.

B. F. MAYO.
SHOE ASSEMBLING AND HEEL SEAT LASTING MACHINE.
APPLICATION FILED FEB. 28, 1912.

1,167,913.

Patented Jan. 11, 1916.
7 SHEETS—SHEET 3.

Fig:3.

WITNESSES:
Elizabeth C. Coupe
J. Blanche Hargraves

INVENTOR:
Benjamin F. Mayo
By his Attorney,
Nelson W. Howard

COLUMBIA PLANOGRAPH CO., WASHINGTON, D. C.

B. F. MAYO.

SHOE ASSEMBLING AND HEEL SEAT LASTING MACHINE.

APPLICATION FILED FEB. 28, 1912.

1,167,913. Patented Jan. 11, 1916.

7 SHEETS—SHEET 4.

WITNESSES.

Elizabeth C. Coupe

O. Blanche Hargraves

INVENTOR.

Benjamin F. Mayo

By his Attorney

Nelson W. Howard

COLUMBIA PLANOGRAPH CO., WASHINGTON, D. C.

B. F. MAYO.

SHOE ASSEMBLING AND HEEL SEAT LASTING MACHINE.

APPLICATION FILED FEB. 28, 1912.

1,167,913. Patented Jan. 11, 1916.

7 SHEETS—SHEET 5.

WITNESSES:

Elizabeth C. Coupe

J. Blanche Hargraves

INVENTOR.

Benjamin F. Mayo

By his Attorney,

Nelson W. Howard

B. F. MAYO.

SHOE ASSEMBLING AND HEEL SEAT LASTING MACHINE.

APPLICATION FILED FEB. 28, 1912.

1,167,913.

Patented Jan. 11, 1916.

7 SHEETS—SHEET 6.

WITNESSES:

Elizabeth C. Coupe

O. Blanche Hargraves

INVENTOR:

Benjamin F. Mayo

By his Attorney

Nelson W. Howard

B. F. MAYO.

SHOE ASSEMBLING AND HEEL SEAT LASTING MACHINE.

APPLICATION FILED FEB. 28, 1912.

1,167,913. Patented Jan. 11, 1916.

7 SHEETS—SHEET 7.

WITNESSES:

Elizabeth C. Coupe

O. Blanche Hargraves.

INVENTOR:

Benjamin F. Mayo

By his Attorney

Nelson W. Howard

COLUMBIA PLANOGRAPH CO., WASHINGTON, D. C.

UNITED STATES PATENT OFFICE.

BENJAMIN F. MAYO, OF SALEM, MASSACHUSETTS, ASSIGNOR TO UNITED SHOE MACHINERY COMPANY, OF PATERSON, NEW JERSEY, A CORPORATION OF NEW JERSEY.

SHOE-ASSEMBLING AND HEEL-SEAT-LASTING MACHINE.

1,167,913. Specification of Letters Patent. Patented Jan. 11, 1916.

Application filed February 28, 1912. Serial No. 680,450.

*To all whom it may concern:*

Be it known that I, BENJAMIN F. MAYO, a citizen of the United States, residing at Salem, in the county of Essex and State of Massachusetts, have invented certain Improvements in Shoe-Assembling and Heel-Seat-Lasting Machines, of which the following description, in connection with the accompanying drawings, is a specification, like reference characters on the drawings indicating like parts in the several figures.

This invention relates to machines for use in the manufacture of shoes and is herein shown as embodied in an organized machine for use in assembling the upper materials, including the linings and the heel stiffener and the shoe insole on the last, positioning these parts and conditioning the upper for lasting, and in fastening these portions of the shoe in assembled and lasted position about the rear part of the last.

Features of the invention comprise combinations with an assembling jack, which may or may not be provided with certain novel characteristics herein described, of novel means for holding or tensioning and holding the upper materials in position upon the last preparatory to fastening the upper materials. As herein shown, these features of the invention are embodied in a last support combined with a toe gripper arranged to tension the vamp of the upper forwardly on both sides of the last and about the side faces of the heel and maintain said upper under tension along its marginal edge as well as elsewhere until it is fastened. Combined with these parts in the illustrated apparatus are shank grippers arranged to engage the upper materials at their marginal edges and tension these parts more or less over the shoe bottom at the shank and maintain them in position to be fastened. These shank grippers are herein shown as supported at one side of the shoe and reaching across the shoe bottom to engage the upper materials at the opposite side of the shoe.

It has been one of the problems in machines for fitting and shaping shoes to position and snugly fit the upper materials to the last at and in the region of the ends of the heel stiffeners without the expenditure of too much time and care in hand manipulation. One contributing factor in this problem is that the heel stiffener of a shoe is usually depended upon to cause the shoe to hug the foot directly above the ball or the large portion of the heel and for this purpose the stiffener is so cut and shaped that its end portions naturally assume a position below the plane of the last bottom when first the stiffener is applied around the heel end of the last and these end portions require to be lifted to the plane of the last bottom for drawing taut that edge of the stiffener which is to be uppermost in the finished shoe. The shank grippers of this invention are adapted to reach across the shoe bottom and downwardly into position to seize the marginal portions of the upper and the lining, grip those parts in desired relation to one another and draw them up over the edge of the shoe bottom and hold them upon the insole in position to be fastened. Inasmuch as the upper may advantageously be under lengthwise tension effected by the toe gripper at the time the shank grippers are engaged with it the action of the latter grippers is to draw the upper materials, including the heel stiffener, snugly to the side faces of the last and hold them. To a large extent the coöperation of these toe and shank grippers brings the heel stiffener ends up into desired position and at any rate holds them firmly. If the operator observes that the stiffener ends are not up as far as they should be he has merely to take hold of them and pull them up and the tension under which the upper is held will retain them in position to be lasted into place without further particular attention.

A further feature of this invention consists in the combination with an assembling jack and a toe gripper for tensioning the upper forwardly along the sides and around the heel end of the last with or without the described shank grippers, of means for bending down the upper materials at the rear end of the heel seat and inserting an assembling tack for uniting said upper materials to the insole at this point while the upper materials are held under tension.

It is also another feature of this invention to combine with an assembling jack and toe gripper such as just described, means for inserting into the rear end face of the shoe an assembling tack for fastening the upper to the last to secure the back seam against displacement from its correct central position by the strains which are applied to the upper in the pulling-over operation.

As herein shown, the mechanisms for inserting the heel end tack just referred to and the heel seat tack previously mentioned are combined to operate together in the same cycle of the machine and while the upper is held under tension by a single manipulation of the toe gripper. Means is provided for adjusting the heel end tacker upwardly and downwardly with relation to the seat tacker whereby the position of the heel end tack is varied. As above suggested, it is contemplated that the seat tacker, which inserts the assembling tack in the heel seat of the shoe, may also be employed while the shoe is still on the assembling jack for inserting one or more tacks at each side of the shoe to fasten the ends of the heel stiffener. It is further contemplated that between the tacks just mentioned and the assembling tack the said tacker may be employed for inserting lasting tacks to fasten the upper in lasted position around the heel seat of the shoe. Preferably there will be employed with the tacker a reciprocating wiper and a feature of the invention is to be recognized in the coöperative relation between this wiper and tacker for lasting the heel seat, said tacker and wiper constituting step-by-step lasting and tacking means for the shoe heel seat.

The shank grippers hold the upper materials in approximately the desired position for wiping in and tacking down the stock at the ends of the heel stiffener but in some styles of shoes where a snug fit is particularly desirable, the stiffener ends and the upper materials should be further pulled in tightly over the heel seat before they are tacked. For this purpose the machine is equipped with a "counter" gripper adapted to seize the edge of the upper, stiffener, and lining, and draw them in and hold them while the tacker fastens them. These materials are apt to be short at this part of the shoe, that is, there is only a narrow marginal portion which can be drawn over the insole. In view of this condition and for other reasons the counter gripper is located laterally adjacent to the tacker instead of being located in front of the tacker. As I am advised, this arrangement of tacker and gripper is novel and in this work it has the advantage that the upper materials can be held by the counter gripper while being fastened, even if they are only long enough to be tacked in.

It will be understood that with the described arrangement the fastening tack is not inserted through the portion of upper which is seized by the gripper but through a laterally adjacent portion. The best results are obtained in drawing in and fastening the work at the ends of the heel stiffener if the gripper pulls and holds the stock in front of or on the toe side of the tacker rather than on the other side. To obtain this result I have equipped the machine with two counter grippers, one located on each lateral side of the tacker, and have provided actuating means for operating the counter grippers alternatively. The counter grippers may, if desired, be employed during the seat and shank lasting; that is, during the insertion of tacks between the assembling seat tack and the stiffener end-holding tacks and along the shank where the upper is held by the shank grippers.

It will be recognized that the described instrumentalities constitute step-by-step lasting means and that the counter gripper when used as described, will occupy a position laterally in advance of the tacker, considering the direction in which the lasting operation progresses. The controlling means for the counter grippers is capable of adjustment so that both grippers are inoperative when they are not needed. It is obviously undesirable that a tack like the heel end tack be inserted in the side faces of the shoe at each operation in which shank fastening tacks or seat lasting tacks are inserted.

Another feature of this invention consists in means for discontinuing the operation of the heel end tacker while the seat tacker continues in use. Preferably, and as herein shown, this means is automatic and is controlled by the position of the shoe, said end tacker being operative when the shoe end is positioned against it and being inoperative when the shoe is turned or is presented with another part than its end opposite to the end tacker. A convenient construction herein shown comprises a device carried on the assembling jack spindle which spindle and device are turned with the shoe and which device coöperates with a throw-out mechanism to render the end tacker inoperative in all positions of the jack except that one in which the end of the heel is presented to the end tacker.

Other features of the invention are to be recognized in the construction of the shank and counter grippers and in the actuating mechanisms therefor, in the starting mechanism arranged for operation by the pressure of the shoe against a counter presser or back stop which holds the upper materials, and particularly the heel stiffener, from springing away from the side of the last while being bent over the edge of the last bottom to receive the fastening tack which is inserted by the power driven mechanism when the machine is so started, and also in certain combinations of parts and more important details of construction herein described, all of which will be pointed out in the claims at the end of the description.

Figure 2:
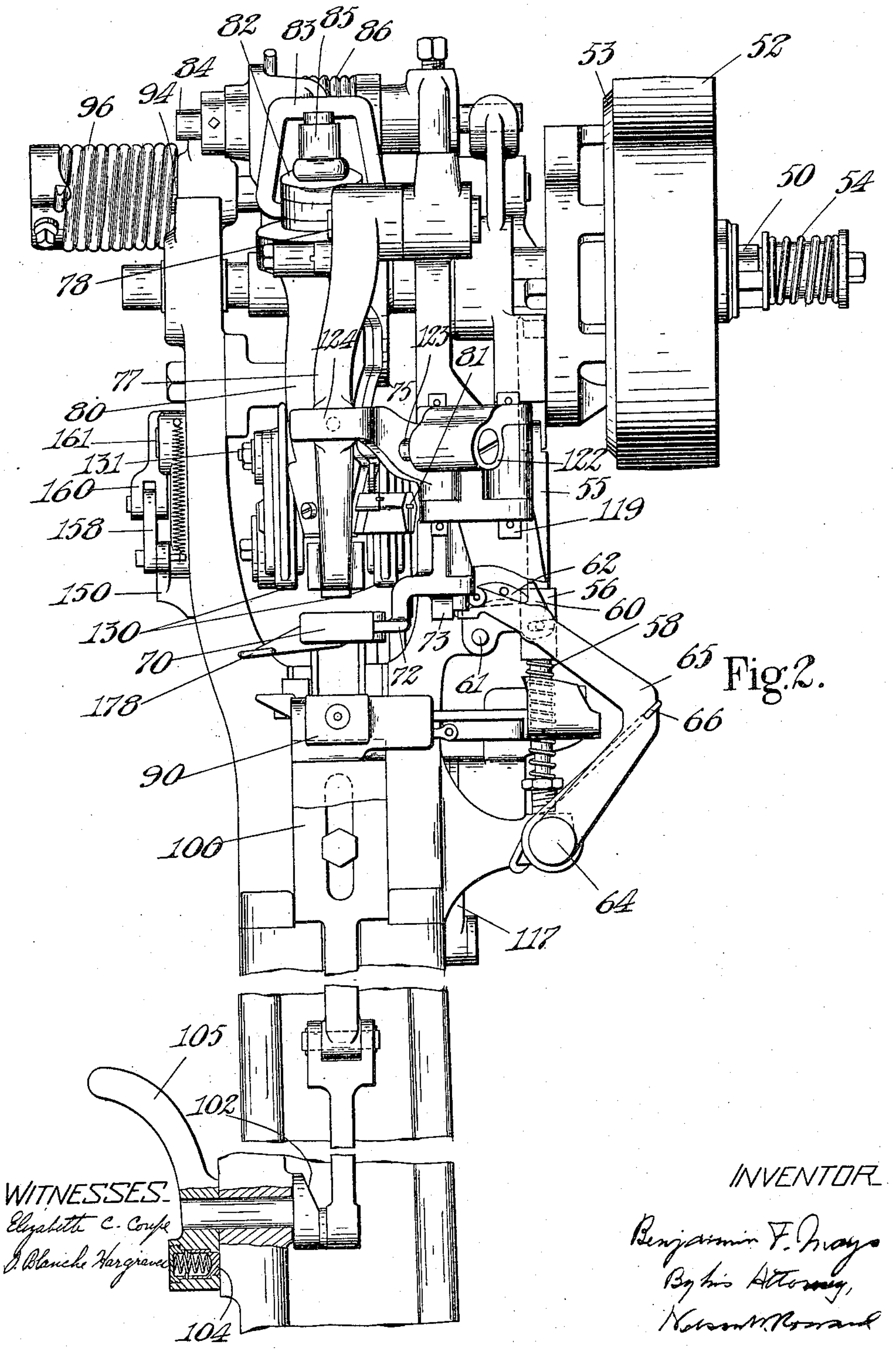
Figure 3:
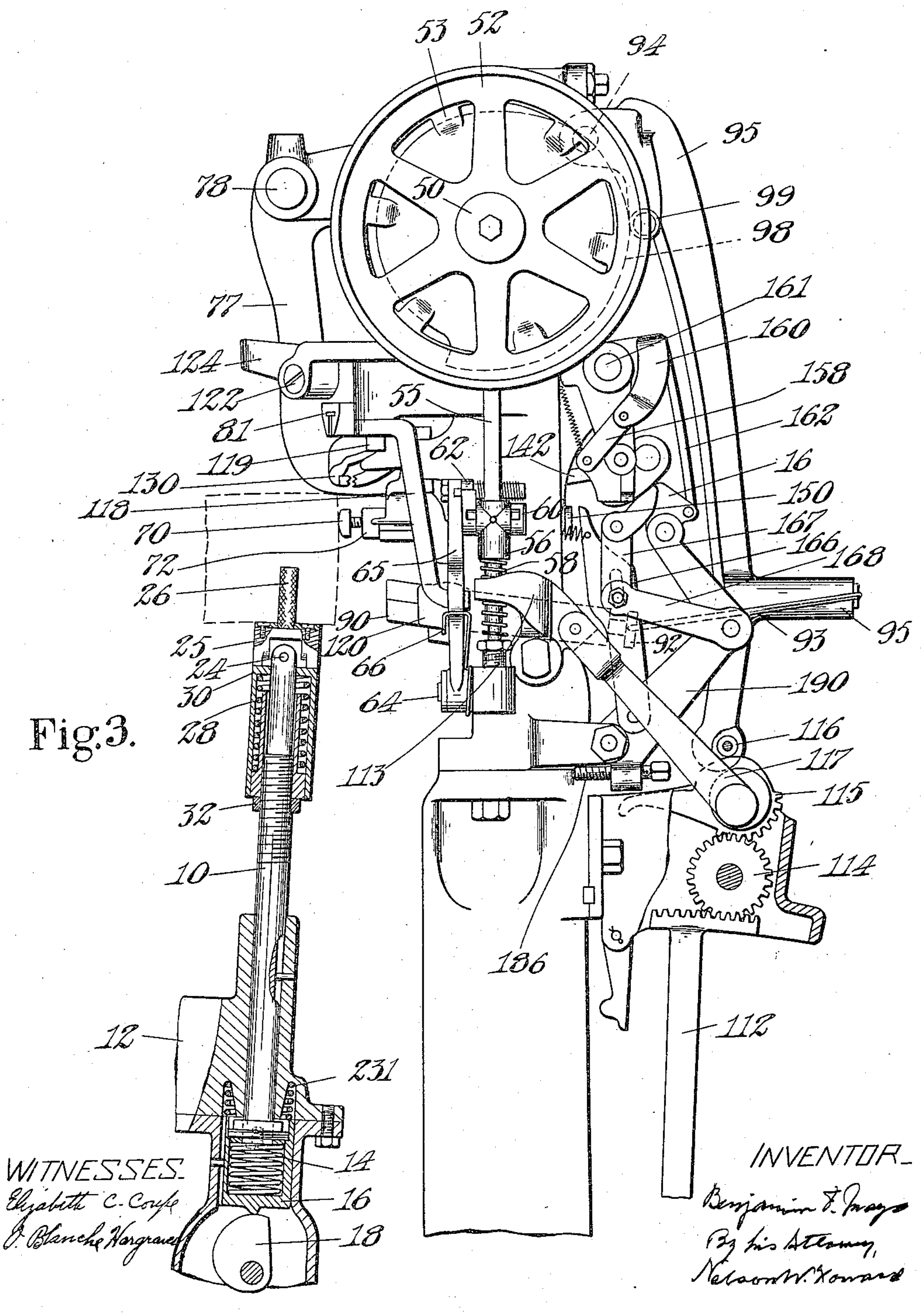
Figures 4, 5:
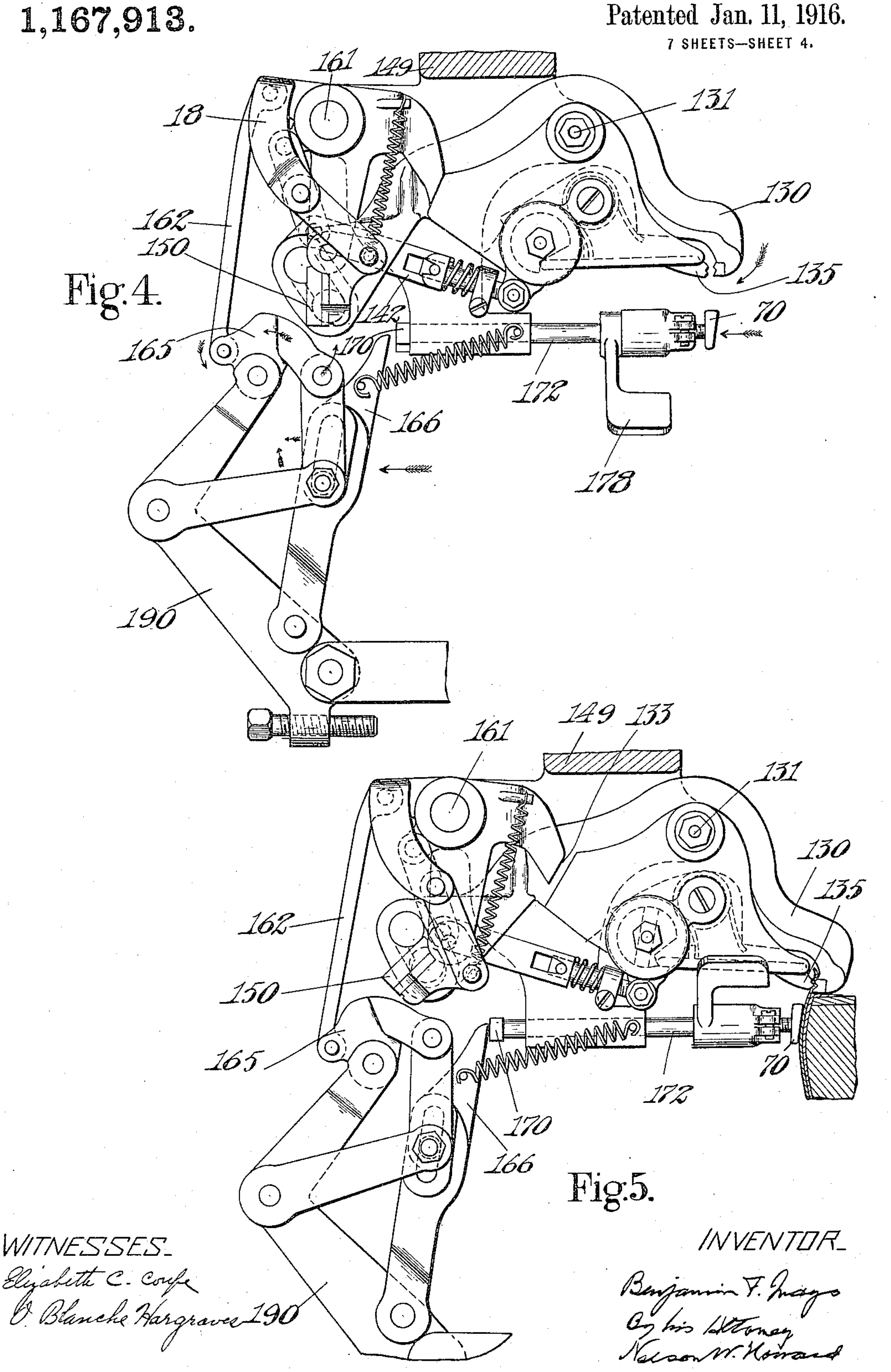
Figure 6:
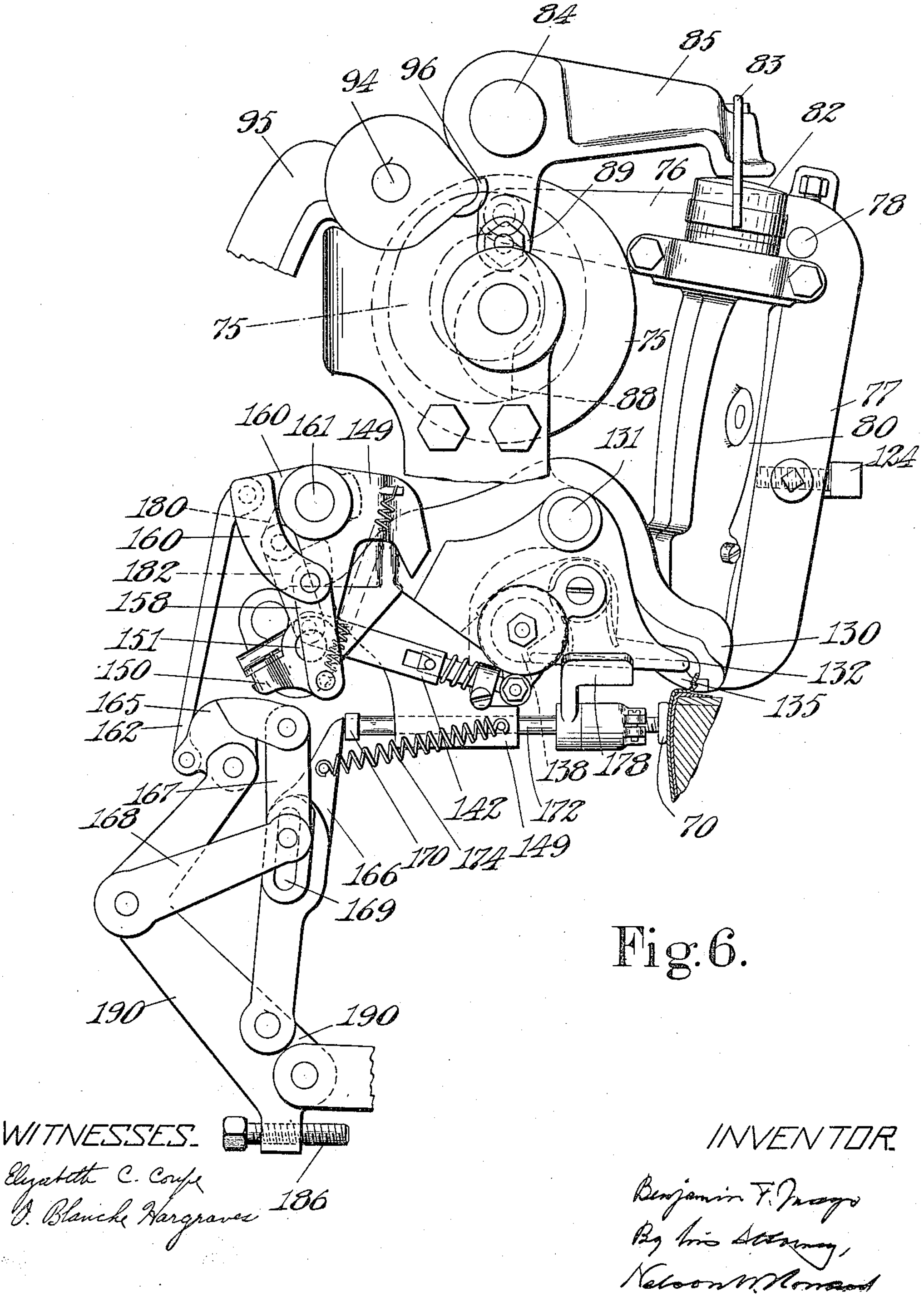
Figures 7, 8, 9:
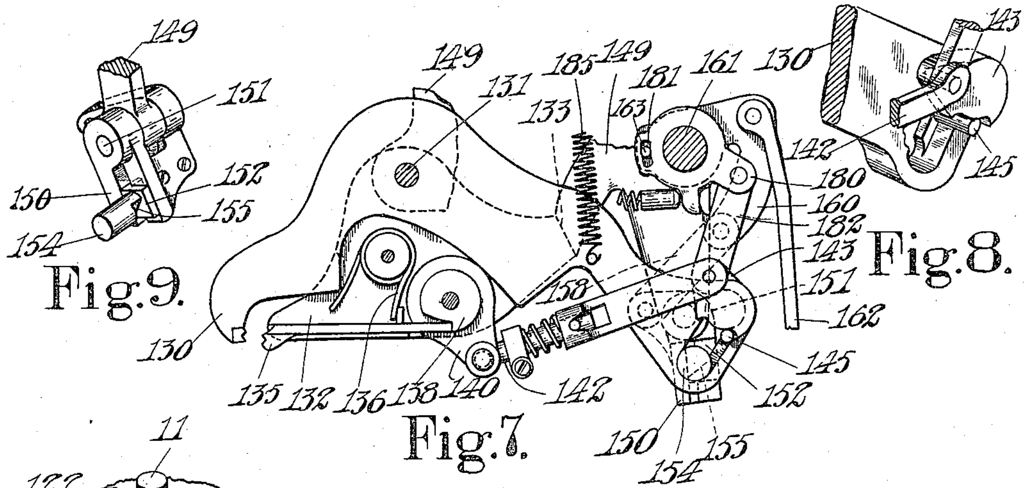
Figure 10:
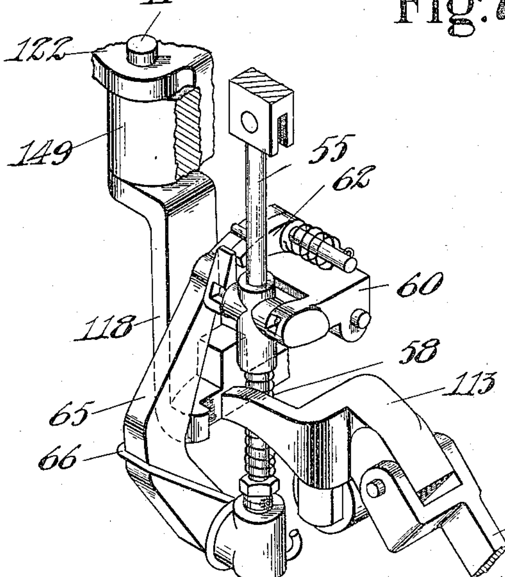
Figure 11:
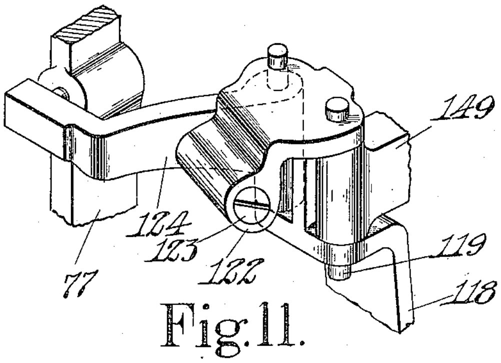
Figure 12:
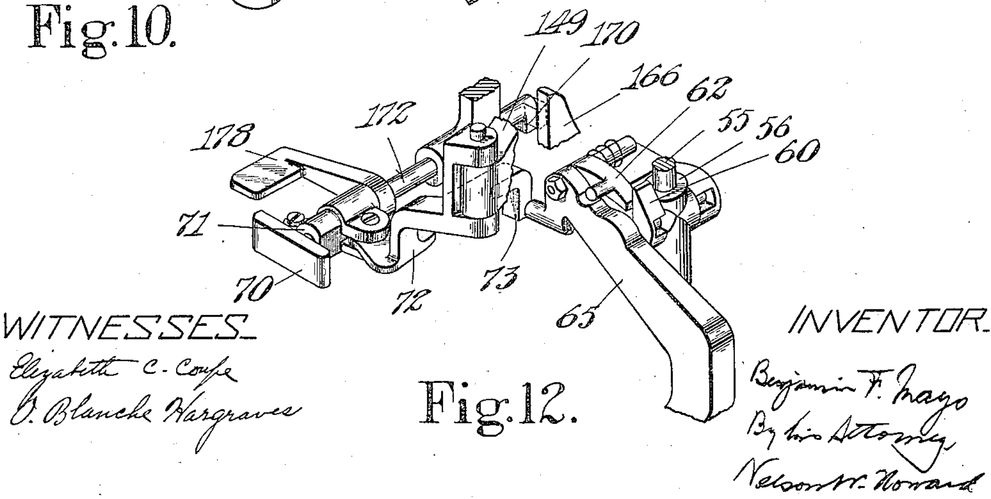
Figures 13, 14, 15, 16:
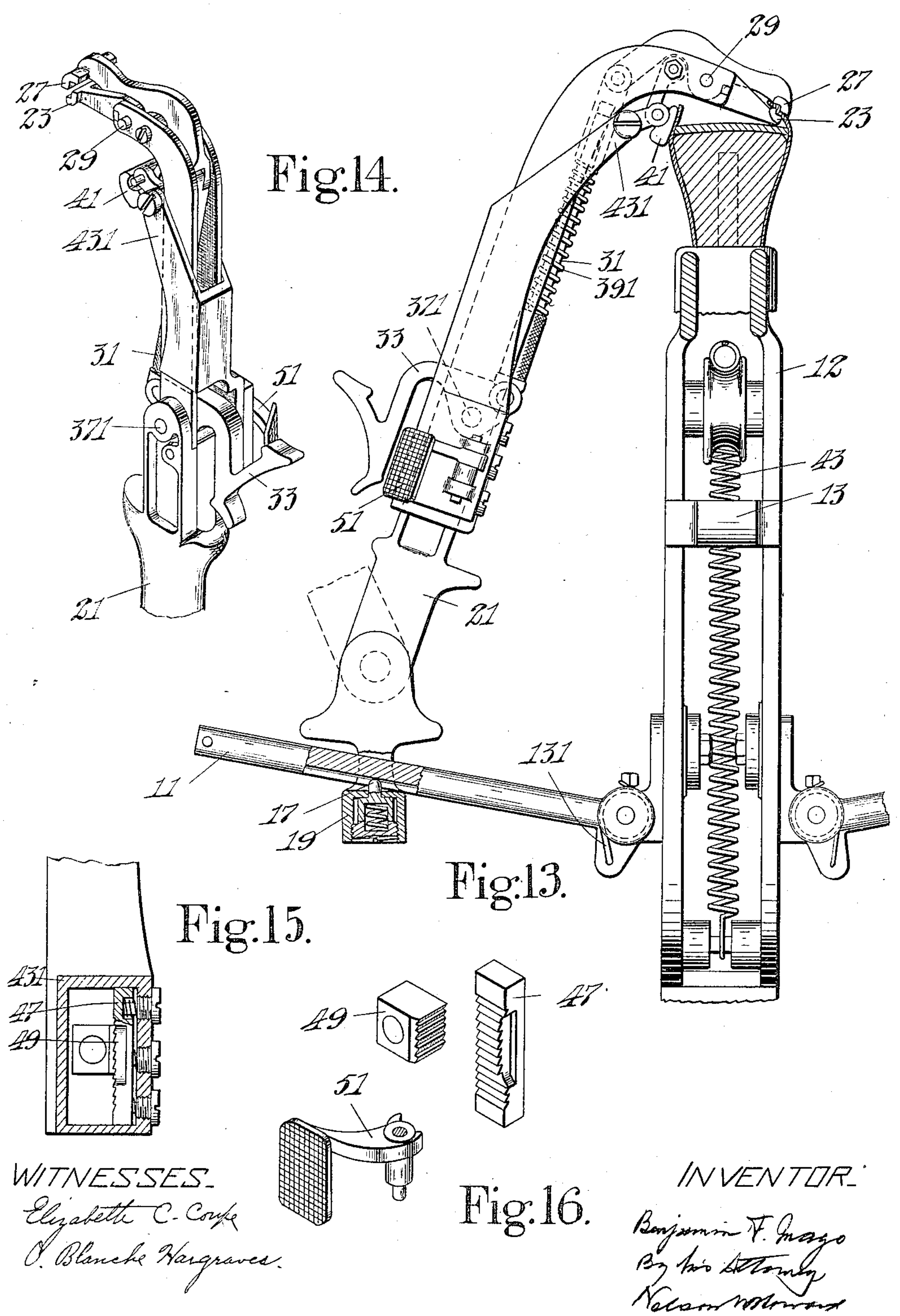

Figure 1 is a left hand side elevation of a machine embodying the present invention in preferred form; Fig. 2 is a front elevation of the upper portion of the machine on a larger scale; Fig. 3 is a right hand side elevation of the upper portion of the machine; Figs. 4 and 5 are side elevations of the gripper mechanism in different positions, Fig. 4 representing the mechanism before the shoe is presented and Fig. 5 when the gripper has been closed; Fig. 6 shows the gripper mechanism and associated parts after the jaws have overdrawn the upper ready for tacking; Fig. 7 is an elevation from the opposite side from that of Figs. 4, 5 and 6; Figs. 8 and 9 are details of Fig. 7; Figs. 10, 11 and 12 are perspective details of parts shown in Fig. 3; Fig. 13 is a front elevation showing the shank puller; Fig. 14 is a perspective view of the same: and Figs. 15 and 16 show details of Figs. 13 and 14.

The machine comprises a floor base 1 from which rises a column 2 carrying the tacking mechanism. From the base also is supported the assembling jack comprising a spindle 4 pivoted at 5 and having a shoulder 6 to coöperate with a shoulder 7 on the base for limiting the outward pivotal movement by which the shoe is carried away from the tacking mechanism. Upon the spindle 4 is fastened a head block 8 which carries the last post 10 and the assembler frame 12, said post having endwise sliding movement in the frame as shown in Fig. 3. The foot of the post rests upon a spring 14 contained within a thimble 16 which in turn rests upon a cam 18. The cam is carried by a short shaft from which extends a handle lever 20 carrying a spring pressed pin to engage a segmental toothed plate 22 for locking the cam in adjusted position. A spring 231 presses the thimble toward the cam. This construction provides for adjustment of the spring 14, said adjustment controlling the firmness with which the shoe is upheld. The upper end of the last post supports, by means of the pivot 24 extending transversely of the machine, a block 25 from which rises the heel pin 26 to enter the usual thimble or pin hole in the heel of the last. Tipping movement of the block 25 about the pivot 24 is resisted by a spring 28 which presses upwardly against a sleeved cap 30 and said spring is adjustable by a nut 32.

The assembler frame 12 extends forwardly and then upwardly approximately to the position of the forepart of a shoe supported on the last post and thence obliquely forwardly and upwardly in a direction approximately parallel with the general plane of the top face of the last as shown in Fig. 1. This frame is bifurcated or formed in two lateral sections on the inclined portion of which slides a toe gripper carriage which comprises upper and lower blocks 35, 36 suitably connected and forming a pivotal support for the upper gripping jaw 38. The lower jaw 40 is rigidly attached to the block 36. A chain or other flexible connection 42 extends from the lower end of the pivoted jaw forwardly over a pulley in the lower end of the block 36, thence upwardly over a pulley in the forward end of the block 35 and thence forwardly and downwardly over a pulley in the front end of the assembler frame. This chain 42 has an adjustable connection with a treadle or foot lever 45 which is pivoted at 44 to an arm that extends forwardly from the lower portion of the spindle 4. The pivotal connection at 44 allows a slight lateral movement of the treadle lever against the resistance of a spring 46 which normally presses a thin edge of the treadle lever into locking engagement with a ratchet plate 48. The block 36 carries a toothed plate 37 with which a pawl 39 on the pivoted jaw engages to lock the jaws 38, 40 in closed position independently of the maintenance of pull upon the chain 42. A spring 43 is tensioned by the movement of the jaws forwardly for stretching the upper and when the treadle 45 is released the spring 43 pulls the grippers down the inclined portion of the assembler frame and causes the pawl 39 to engage a projection 13 on the frame and unlocking of the gripper jaws so that they are freed from the shoe.

The above described mechanism constitutes an improved apparatus for practising the method explained in U. S. Patent No. 855,831, granted June 4, 1907, on application of Emery Bayard.

The shank pullers are attached to supporting rods 11, one only of which is detailed in Figs. 13 and 14, which extend laterally from either side of the assembler frame 12, each being connected by a horizontal pivot to said frame and upheld by a spring 131. Each of the rods 11 is grooved on its lower face to receive a spring-pressed pin 17 located in the carrier block 19, this arrangement permitting the carrier block to slide against friction inwardly and outwardly but to restrain it normally from turning around the rod far enough to permit the shank puller to fall into an inoperative or an inconveniently reached position. If the shank puller is not to be used, however, this construction permits the block 19 to be turned, by the application of sufficient force to dislodge the spring pin from the groove, around the rod 111 so that it will hang down in an out-of-the way position. The stem 21 of the shank puller has pivotal movement on the block 19 limited in the outward direction by stop shoulders as indicated by dotted lines, Fig. 13, and at its upper end the stem is curved or bent inwardly to provide a horizontal arm to which is attached the lower shank gripper jaw 23 by interlocking shoulders and recesses on the jaw and stem and by a locking pin. The cooperating jaw 27 is pivoted to the stem at 29 and at its outer end receives slidingly a rod 31 which is adjustably connected at its lower end to an operating lever 33 which is pivoted to the stem at 371. The spring 391 encircling the rod 31 restores the jaws to open position when permitted to do so. The arrangement of the parts is such that when the lever 33 is turned down it closes the jaws and then slides the rod 31 upwardly against tension of the spring 391 until the lever is swung in between two side members of the stem. In this position the connection of the lever with the rod 31 is directly above its pivotal support 371 in which position said rod and the short arm of the lever act as a straightened toggle by which the gripper is automatically held closed.

The stem 21 supports a fulcrum block 41 for engaging the side of the last opposite to that at which the jaws 23, 27 seize the upper and pulling movement is effected by sliding the lower end of the stem 21 and its carrier block 19 inwardly on supporting rod 11 to cause the jaws to move outwardly and upwardly about the fulcrum block. Provision is made for adjusting the relation of this fulcrum block to the gripper jaws to accommodate narrow and wide lasts. For this purpose the block is carried by two toggle members the upper one of which is connected to the horizontal portion of stem 21 and the lower member, 431, of which slides lengthwise of the stem and at its lower end carries a ratchet plate 47 which is normally spring pressed, see Fig. 15, against a coöperating ratchet block 49 carried by the stem. A finger lever 51 has a short arm located under the ratchet plate 47 for moving it out of engagement with the block 49 to permit the toggle member 431 to be raised or lowered, thereby adjusting the fulcrum block 41 inwardly or outwardly. The shank pullers on the two sides of the assembling jack are alike. It is contemplated that during the assembling of the shoe these pullers will be engaged with the upper and the lining at the two sides of the shank and operated to pull the stock upwardly and inwardly over the shoe bottom in position to be fastened to the shank portion of the insole and will there hold the stock while the jack is moved for presenting the shoe to the tacker in position for the upper to be fastened. The shank pullers have the incidental function of causing the upper to draw the end portions of the heel stiffener against the side faces of the last. Usually it will be found that the action of the shank pullers, with or without some slight assistance from the operator, will position and hold the end portions of the stiffener in place for them to be lasted in upon the heel seat.

The column 2 supports a shaft 50 bearing a loose pulley 52 and a fast member 53 into driving engagement with which the pulley 52 is movable by a spring 54. Automatically operating means is provided for reversely moving the pulley 52 to open the clutch and stop the machine at the end of each revolution of the shaft; this controlling means, which may be of any suitable construction and forms no part of the present invention, being operated by the rod 55. A collar 56 embraces the rod 55, Figs. 2, 3 and 12, and acts against a spring 58 to depress said rod at times for permitting the clutch to close and a cycle of the power driven parts of the machine to be effected. For depressing the sleeve 56, said sleeve has a pin and slot connection, Fig. 2, with the right hand end of a lever 60 which is pivoted at 61 to the frame and is acted upon by a pawl or pusher 62 pivoted on the bent lever 65 which is fulcrumed to the frame at 64 and normally turned toward the left by a spring 66. The path of movement of the pusher 62 effected by the form and arrangement of lever 65 is such that after actuating the lever 60 to depress the sleeve 56 the pusher rides over the abutting face of lever 60 and allows the spring 58 promptly to uplift the rod 55 again for placing the clutch controller in position to stop the machine at the end of its cycle. The lever 65 is actuated by the pressure or thrust of the shoe backwardly against a combined feeler and back rest 70 which slides into abutting engagement with a bearing 71 which is adjustable in the forwardly projecting arm of a bell crank 72 which turns about a vertical axis and has a rear arm 73 in position to strike the upper arm of lever 65 when the bell crank is turned by the shoe, Fig. 12.

Upon the power shaft 50 is mounted a cam 75 that rocks an angle lever 76, 77 pivoted at 78 to actuate the lower end face of the depending arm of said lever forwardly over the shoe which has been positioned against the back stop 70 for tripping the machine. This lower end face of arm 77 constitutes a wiper for bending or breaking down the upper materials upon the heel seat into condition to be tacked for fastening them in lasted position. Secured to the arm 77 is a driver guide 80 in which is movable a driver having an enlarged head 82 that is connected by a link 83 with a driver lever 85 that turns on a rod 84 which is fixed in the machine frame. A spring 86 encircles the rod having one end fastened thereto and the other end acting against the lever 85 for actuating it in the direction to drive a tack. Reverse or upward movement of the lever and driver is effected by a cam 88 acting on its arm 89. The driver guide has a transverse tack passage 81 for a tack strip and mechanism of well known construction is provided for advancing the strip step-by-step to present a tack under the driver prior to each descent of the driver. This type of strip tacking apparatus is too well known to require description and reference may be had if desired to British specification No. 20010/05 for illustration and description of a somewhat similar construction employing this tacker. The tacker cam 88 is arranged with relation to the wiper cam 75 to insert a tack into the overwiped stock at the moment the wiper reaches the limit of its forward movement.

A second driver guide 90 is arranged in an approximately horizontal plane for use in inserting a temporary tack into the rear end face of the heel for fastening the upper materials to the last at or adjacent to the back seam of the shoe, it being understood that this tack is removed after the shoe has been pulled over. Within this driver guide 90 operates a plunger having an enlarged head 92, Fig. 3, that is connected by a link 93 with a lever 95, said lever being fastened on a rod 94 which can turn in the machine frame, a spring 96 having one end fastened to the head of said rod, Fig. 2, and its other end in engagement with the frame for actuating the lever in the direction to insert the tack. An edge cam 98, Fig. 3, on the driving shaft 50 is engaged by a roll on a depending arm 99 of the lever 95 for moving the lever in the direction to retract the driver and tension the spring 96. The driver guide 90 has a transverse passage for a tack strip and means is provided similar to that above referred to for advancing the tack strip step by step. The driver guide 90 is pivotally supported at its rear end and the elevation of its front end is controlled by a slide 100 connected by a link 101 to an eccentric 102 to which is attached a handle 105 in the hub of which is a friction plunger 104 to retain the driver guide in the position to which it is adjusted by means of the handle. This mechanism provides for the insertion of the heel end tack nearer to or farther from the heel seat as the conditions of the work may require.

The spindle 4 carries a cam or the like 110, Fig. 1, which engages a horizontal arm of a bell crank pivoted to the column at 111 and having an upright arm 112 the end face of which is toothed and engages a pinion 114. This pinion turns in fixed bearings and has engagement with the toothed face of a locking device 115, Fig. 3, which is provided in its upper face with a seat for a roll 116 on the lower end of the driver lever 95. When the spindle 4 is turned by movement of the shoe to position any other part than the rear end face of the shoe toward the driver guide 90 then the bell crank is actuated by the cam 110 to turn the locking device 115 upwardly into engagement with the lever 95 and thereby prevent the movement of said lever in the direction in which it is pressed by the spring 96 for driving the heel end tack. An eccentric on the pivot pin of the locking device 115 actuates the link 117 to move a lever 113 into the path of a rocker 118 that turns about the vertical stud 119, Figs. 2, 10 and 11, and has its rear arm in position normally to engage and actuate the feeding device 120 that advances the tack strip through the driver guide 90. The other arm 122 of the rocker 118 carries a spring pressed plunger 123 which is engaged by a swinging arm 124 that stands in the path of the wiper arm 77 from which wiper arm movement is normally transmitted through the rocker to the tack feeder. The lever 113, however, locks the rocker 118 to stop the feed of tacks when the driver lever 95 is stopped and while this condition prevails the spring plunger 123 takes up the movement derived by arm 124 from the wiper arm 77.

Located upon each lateral side of the wiper 77 and its associated tacker is a counter gripper. These two counter grippers are alike and are to be employed alternatively according to which end of the heel stiffener is to be pulled up and tacked or according to the direction in which the lasting and tacking operation will proceed from the heel seat, it being contemplated that the operation will proceed around the middle of the rear end of the heel seat, first around one corner toward the shank and then from the same starting point around the other corner forwardly toward the shank and that the gripper which is in advance of the tacker, considering the direction of progress, will be used to seize, straighten, or lightly pull, and hold the stock over the shoe bottom laterally adjacent to the point where the wiper 77 and tacker are to operate. It is contemplated that the upstanding stock as, for example, the upper, heel stiffener end and lining will be positioned between the open jaws while the machine is at rest and that through the actuating mechanism about to be described, movement of the shoe backwardly against the feeler or back stop 70 will cause the jaws to be closed. The jaws have a slight backward pivotal movement during this movement of the shoe so that the upper is not withdrawn from them before they seize it. Thereafter the shoe has a further backward movement to tension the upper and during this movement the gripper swings down slightly to lay the stock in position to be tacked.

The tacker is started automatically by mechanism previously described during the last part of the movement of the shoe so that a tack is inserted to fasten the upper while it is held drawn over the last bottom by the counter gripper. One of these counter gripper mechanisms is shown in Figs. 4, 5, 6 and 7 and comprises an outer jaw 130 pivoted at 131. 132 indicates an inner jaw carrier which turns about the same pivot 131, Fig. 7, and has a horizontal slideway in which the inner jaw 135 is movable endwise toward and from the gripping face of the outer jaw. Movement of the inner jaw backwardly in its carrier is effected by a spring 136, Fig. 7. This spring is coiled around the stud 131 and has its front free end underlying a shoulder on the jaw 130 as shown in Fig. 4 to lift the jaw to open position. The other or rear end of the spring 136 engages a lug on the sliding jaw 135 to press it backwardly in its carrier into engagement with a cam 138 which is pivoted in the jaw carrier 132. The backward pressure of this rear arm of the spring not only slides the jaw 135 but when that jaw as engaged the cam the jaw carrier 132 is tipped about the pivot 131 until its rear end is brought into engagement with a fixed stop 133, as in Figs. 4 and 7. This tipping movement of the jaw carrier 132 lowers the jaw 135 below the jaw of member 130 as shown in Fig. 7 so that in the reverse or closing movement jaw 135 has an upward wiping movement over the face of the upper. The cam 138 has a depending arm 140 which is actuated yieldingly through the two part link 142. The first effect of pressure tending to actuate this cam is to tip the jaw carrier 132 against the pressure of the rear arm of spring 136 and so cause jaw 135 to wipe upwardly as just above suggested. Further pressure turns the cam 138 and slides jaw 135, against increasing resistance of the spring 136, forwardly to grip the stock as in Figs. 5 and 6.

Referring now to Figs. 6, 7, 8 and 9, for the actuating mechanism for the counter grippers it may be seen that the link 142 is pivoted to a short crank 143 that is pivoted in the rear end of jaw member 130, see Fig. 8. This crank arm and the link 142 form the members of a jaw closing toggle. The movement of the crank arm relatively to member 130 is limited by a stud 145 which projects from the member 130 into a concentric notch in the periphery of the crank arm hub. After this relative movement has been exhausted the crank arm and the jaw member 130 move together about the pivot 131 to updraw the shoe stock as will more fully appear. An angle lever 150 is hung on a stud 151 which projects from a portion of the frame, designated in various places on the drawings as 149, and in the depending arm of this angle lever is a slot in which a block 152 can slide up and down but cannot turn. From this block projects rigidly a pin 154 which, considering its function, constitutes a crank pin engaging in the extreme rear end of the jaw member 130, Figs. 7 and 8. From the pin's seat in said jaw member extends upwardly and backwardly a relatively narrow slot and the pin is slabbed off at 155, full lines in Fig. 9 and dotted lines in Fig. 7, to a width equal to the width of this slot. But the slabbed face of the pin is at an angle to the slot when the parts are in their usual position, Fig. 7, and therefore the crank pin acts to lift member 130 until such time as its face 155 becomes parallel with the slot whereupon it slides up in the slot without further lifting said member during the completion of the crank stroke.

For operating the angle lever 150 a link 158 connects its lateral arm with a rocker 160 which is fulcrumed on the frame stud 161. In the illustrated embodiment of this invention in which the gripper is to be actuated by pressure applied through the shoe itself, a long upright rod 162 connects this rocker with another rocker 165, see Figs. 6 and 3, which is turned by a lever 166 acting through a toggle constituted by links 167, 168 with whose connecting pin the lever has a sliding engagement in slot 169. The upper end of lever 166 is adapted to be engaged by an adjustable rear end block 170 on a plunger 172 which can slide endwise in the frame and has on its front end a head block which has been previously referred to as the combined back rest and feeler 70 for engagement by the shoe, as shown in Fig. 6. A return spring 174 pulls the lever 166 forwardly and thereby maintains the upright rod 162 raised and the several parts of the connections and the grippers in the position shown in Fig. 7.

When the feeler 70 is pressed backward by the shoe motion is transmitted through the described connections to the angle lever 150 and by its crank pin to the jaw member 130 which is thereby turned about its pivot 131 in the direction to lower the open jaws toward the shoe bottom. This movement about the pivot 131 has a backward component for the jaws to compensate for the backward movement of the shoe as it is moved rearwardly against the feeler 70, so that the stock to be gripped is not drawn away from the jaws by the movement of the shoe. In this movement about pivot 131 the crank pin block slides up in its slot in the depending arm of lever 150 and the pin is also turned gradually until its slabbed side is parallel with the slot leading from the pin seat in the jaw member 130 after which movement of angle lever 150 may be continued, with the gripper jaws in their lowered position, to close the jaws upon the shoe stock. This slot provides a lost motion connection between lever 150 and jaw member 130.

The closing crank 180 is pivoted on the same frame stud 161 that supports the rocker 160 and the crank has a short slot 181 concentric with said pivot into which projects a pin 163 from the rocker. This provides a lost motion connection while the jaws are being lowered for gripping and then an actuating connection from the rocker to the closing crank whereby the closing of the jaws is effected from the same operating means as is the lowering of the jaws.

The crank 180 is connected by a link 182 with the link 142, before described, at the point of connection of link 142 with crank 143 which link and crank may be considered as forming a toggle for which the link 182 is the actuator. It may be noted that this toggle 142, 143 is flexed in Fig. 7 and nearly straightened in Fig. 8. The link 142 yieldingly presses forward against arm 140 which through spring 136 first causes the jaw member 132 to rock about 131 and effect an upward wiping of the outer layer (the upper) of the shoe stock followed, or accompanied, by a forward sliding movement of jaw plate 135 to seize the stock. The forward thrust of arm 140 and sliding jaw 135 have a tendency to rock the entire gripper about the pivot 131, which tendency, if not resisted, might cause the jaws to be lifted before they had securely seized the stock. A spring 185 is therefore arranged between the frame and the rear portion of jaw member 130 to prevent such untimely rocking until after the jaws have obtained a non-slipping hold of the stock. Thereafter the upper end face of the edge notch in the hub of crank 143 is made to engage the stud 145 on the tail of jaw member 130, after passing the position shown in Fig. 8 and, forcibly depressing the rear end of the gripper members, raises the jaws to pull up the shoe stock. The purpose of this gripper is to tighten over the last the upper laterally adjacent to the gripper and it is not essential that it lay the upper closely down upon the last bottom as it is desirable should be done by a gripper that works directly in front of the tacker.

As has been stated there are two counter grippers of which one is located on each lateral side of the tacker 77, see Fig. 2, and only one is used at a time. The operating mechansim for the two grippers are duplicates of each other, one being located on each lateral side of the median vertical plane of the machine with the levers 166, Fig. 6, spaced apart a distance which will permit the eccentric head 170 of plunger 172 to be moved between them in case it is not desired to use either counter gripper and which will permit said head to be turned to operate the lever 166 of either gripper. The head is turned by a lever 178 and is held in adjusted position by friction. An adjusting screw 186, Figs. 1 and 3, renders rigid the bracket 190 upon which the rocker 165, the toggle member 168 and the lever 166 are pivoted and serves to adjust said parts from and toward the plunger 172 to obtain more or less actuation of the grippers from the movement of the shoe into tack receiving position.

The invention has been explained in connection with a machine for performing assembling, tacking, heel seat and shank lasting operations. It is to be understood that various combinations comprised within the invention relate to shoe machines for performing one or more of these operations but not all of them.

Having stated the nature of the invention, I claim as new and desire to secure by Letters Patent of the United States:—

1. An assembling and tacking machine having, in combination, a support for a last, a gripper to tension the upper forwardly about the heel end of the last and hold it under tension for the fastening operation, and tackers arranged to insert tacks at right angles to one another in the seat and the rear end face of the heel while the upper is so held under tension.

2. An assembling and tacking machine having, in combination, a support for a last, a gripper to tension the upper forwardly about the heel end of the last and hold it under tension for the fastening operation, a tacker, and power driven mechanism for actuating said tacker arranged to be started by the pressure of the shoe during the movement of the shoe into position to be fastened.

3. An assembling and tacking machine having, in combination, a last support, a gripper to tension the upper forwardly about the rear end of the last, a tacker to fasten the upper materials to the insole at the rear end of the heel seat, and power driven mechanism for said tacker, said machine including a counter presser to hold the heel stiffener from springing away from the rear end face of the last when the upper materials are bent over the insole into position to be fastened, said counter presser being movable by the work and arranged to start the tacker actuating mechanism.

4. An assembling and tacking machine having, in combination, a last support, a gripper to tension the upper forwardly about the rear end of the last, and a tacker arranged to drive a tack into the rear end face of the shoe while the upper is held under tension by said gripper.

5. An assembling and tacking machine having, in combination, a last support, a gripper to tension the upper forwardly about the rear end of the last, an end tacker into operative relation to which the last support can carry the shoe endwise with the upper held under tension by the gripper, and means adapted to be tripped during said endwise movement of the shoe for causing the tacker to insert a tack through the upper into the heel end face of the last.

6. An assembling and tacking machine having, in combination, a last support, a gripper to tension the upper forwardly about the rear end of the last, a seat tacker and an end tacker into operative relation to which the support and shoe are movable with the upper held by the gripper, and means arranged to be engaged by the shoe during such movement to cause the two tackers to do their work.

7. An assembling and tacking machine having, in combination, a last support, a gripper to tension the upper forwardly about the rear end of the last, a seat tacker and an end tacker into operative relation to which the support and shoe are movable with the upper held by the gripper, and a counter presser arranged to engage the side face of the shoe between said two tackers to hold the heel stiffener from springing away from the last when its edge portion is bent over the heel seat and being movable by such engagement to cause the tackers to do their work.

8. An assembling and tacking machine having, in combination, a last support including means determining the longitudinal position of the shoe thereon, a gripper operatively connected with said last support and arranged in such relation to the last support as to adapt it to engage the front end portion of the heel stiffener and hold it over the insole in position to be fastened, and a tacker for fastening said end portion of the stiffener.

9. An assembling and tacking machine having, in combination, a last support, a pair of grippers arranged to engage the opposite ends of the counter and draw them over the insole into position to be fastened, and a tacker, said machine having provision for relative movement of the tacker and said support and associated parts into position for the counter ends to be tacked successively.

10. An assembling and tacking machine having, in combination, a last support, shank pullers arranged to reach from opposite sides of the last across the bottom thereof to engage the shoe stock and draw it into position over the insole for fastening, and a tacker into operative relation to which said shoe support and associated parts are movable for fastening the pulled stock.

11. An assembling and tacking machine having, in combination, a last support, a shank puller movably mounted on each side of the last support and formed and arranged to extend across the shoe bottom for engaging and pulling the shoe stock from one side of the shank toward the other, means for causing said pullers to seize the stock, and other means for actuating said pullers to pull the stock.

12. An assembling and tacking machine having, in combination, an assembling jack, a toe gripper to tension the upper about the rear end of the last, shank grippers to pull over the two shank sides, and a tacker with relation to which said assembling jack is movable to present the shoe for the insertion of tacks to fasten the upper materials successively at the rear end of the heel seat and at the sides of the heel seat adjacent to the shank grippers.

13. An assembling and tacking machine having, in combination, an assembling jack, a toe gripper to tension the upper about the rear end of the last, shank grippers to pull over the two shank sides, and tacking mechanism relatively to which the assembling jack is movable to present the shoe for the insertion of a heel end tack and a seat tack at the rear of the heel seat and for the insertion of tacks into the heel seat adjacent to said grippers.

14. An assembling and tacking machine having, in combination, an assembling jack, a toe gripper to tension the upper about the rear end of the last, shank grippers to pull over the two shank sides, and tacking mechanism relatively to which the assembling jack is movable to present the shoe for the insertion of a heel end tack and a seat tack at the rear of the heel seat and for the insertion of tacks into the heel seat adjacent to said grippers, said machine having means for automatically rendering inoperative the mechanism for inserting the end tack when the jack is presented in position for the insertion of seat tacks adjacent to the shank grippers.

15. An assembling and tacking machine having, in combination, an assembling jack which can turn about a vertical axis, a seat tacker, an end tacker, and actuating mechanism for operating said two tackers together when the jack is positioned for presenting the heel end of the shoe to the tackers and for operating the seat tacker only when the jack is turned from said position.

16. An assembling and tacking machine having, in combination, an assembling jack, two tackers arranged to operate together when the jack occupies one relation to the tackers, and means for automatically discontinuing the operation of one only of said tackers when the jack is moved into a different relation to the tackers.

17. An assembling and tacking machine having, in combination, a seat tacker, an end tacker, an assembling jack movable to present the shoe with the end and also the sides of the shoe in operative relation to said tackers, and controlling means for the end tacker rendering the same operative when the end of the heel is presented and inoperative when the side of the heel is presented.

18. An assembling and tacking machine having, in combination, a seat tacker, an end tacker, an assembling jack movable to present the shoe with the end and also the sides of the shoe in operative relation to said tackers, and a device moved by the jack to render the end tacker inoperative when the side of the heel is presented to the seat tacker.

19. A tacking machine having, in combination, mechanisms for inserting two fastenings, a jack, and a connection from said jack to one of the inserting mechanisms for rendering that inserting mechanism operative or inoperative while the other inserting mechanism remains operative.

20. A tacking machine having, in combination, mechanisms for inserting two fastenings, a jack mounted to turn for presenting different sides of the shoe to the inserting mechanisms, and a connection from said jack to one of said mechanisms for automatically rendering said mechanisms operative or inoperative according to the position which the jack occupies.

21. An assembling and tacking machine having, in combination, an assembling jack including a gripper to tension the upper forwardly about the heel end of the last, and a seat tacker relatively to which the jack and gripper are movable for presentation of the shoe to the tacker in positions for insertion of tacks successively around the heel seat of the shoe while the upper is held under tension by the gripper.

22. An assembling and tacking machine having, in combination, an assembling jack including a gripper to tension the upper forwardly about the heel end of the last, and a step-by-step lasting and tacking mechanism with relation to which the shoe may be positioned and turned for progressively lasting and tacking the heel seat while the tension on the upper is maintained by the gripper.

23. An assembling and tacking machine having, in combination, an assembling jack, a tacker, and grippers located at each side of the tacker and arranged to pull and hold portions of the stock laterally adjacent to the point where the tacker operates.

24. An assembling and tacking machine having, in combination, an assembling jack, a tacker, grippers arranged at each lateral side of the tacker, and connecting mechanism for actuating the grippers to seize and hold portions of stock while the tacker inserts a tack between the gripped portions of the stock.

25. An assembling and tacking machine having, in combination, a tacker, a gripper located on one lateral side of the tracker, actuating mechanism for causing said parts to grip and pull one portion of stock and to tack another portion, and means for rendering the gripper operative or inoperative while the tracker continues operative.

26. An assembling and tacking machine having, in combination, an assembling jack, a tacker, and grippers located on each lateral side of the tacker.

27. An assembling and tacking machine having, in combination, an assembling jack, a tacker, grippers located on each lateral side of the tacker, and means for rendering either of said grippers operative alternatively.

28. An assembling and tacking machine having, in combination, an assembling jack including a toe gripper for tensioning an upper about the heel end of a last, a tacker for progressively tacking the heel seat while the upper is so held under tension, and a gripper arranged laterally adjacent to the tacker on the side thereof toward which the tacking operation is progressing and adapted to seize and draw over the heel seat a portion of the upper materials immediately in front of the portion acted upon by the tacker.

29. An assembling and tacking machine having, in combination, a tacker, a gripper laterally adjacent to the tacker, power mechanism for operating the tacker, mechanism for operating the gripper, and means arranged to be engaged by the shoe for causing said mechanisms to operate.

30. An assembling and tacking machine having, in combination, an assembling jack for carrying a shoe, a plurality of tackers, means arranged to be engaged and operated by movement of the shoe and jack for causing the actuation of said tackers, and other means arranged to be operated by a different movement of the shoe for rendering one of said tackers inactive during repeated actuations of the other tacker.

31. An assembling and tacking machine having, in combination, an assembling jack for carrying a shoe, a plurality of tackers, means controlled by a movement of the shoe and jack for causing said tackers to be actuated, and means controlled by a different positioning movement of the jack for independently controlling one of said tackers.

32. An assembling and tacking machine having, in combination, an assembling jack, a toe gripper carried by the jack for tensioning the upper about the heel of the last, shank grippers carried by the jack for pulling the upper over opposite sides of the shank, said grippers being arranged to maintain the upper under tension, and a tacker into operative relation to which the jack may be moved for effecting fastening of the upper while it is continued under tension.

33. An assembling and tacking machine having, in combination, an assembling jack, a tce gripper to tension the upper forwardly about the heel portion of the last, a shank gripper to tension the upper inwardly over the shank whereby the end portions of the heel stiffener are pressed into position to be fastened by the action of the tensioned upper thereon, and a tacker into operative relation to which the assembling jack can move for presenting the shoe in position for the stiffener ends to be fastened.

34. An assembling and tacking machine having, in combination, an assembling jack, a toe gripper to tension the upper forwardly about the heel portion of a last, and a tacker and counter gripper into operative relation to which the jack can be moved for presenting the shoe in position to cause the counter gripper to pull up an end of the counter for the tacker to fasten it.

35. An assembling and tacking machine having, in combination, an assembling jack comprising a support for a last, a forepart gripper, means for operating the gripper to pull the upper to hold it under lengthwise tension around the heel portion of the last, and shank grippers each arranged to extend across the shoe bottom from one side of the jack to engage the upper on the opposite side of the last and being movable to pull the upper into lasted position over the shoe bottom.

36. An assembling and tacking machine having, in combination, an assembling jack comprising a last supporter, grippers arranged to engage the upper at opposite sides of the shank and draw it into position to be fastened to the insole, and a tacker into operative relation to which the jack can be presented for fastening the upper on two sides of the shank successively while it is so held by the shank grippers.

37. A machine of the class described having, in combination, a jack having means for supporting the last, and a shank puller movably connected with the jack below the last and having jaws to reach across the shoe bottom for engaging the upper on one side of the last and having a fulcrum block engaging the shoe on the other side of the last and about which the jaws are movable relatively to the jack for pulling the upper.

38. A machine of the class described having, in combination, a jack having means for supporting the last, a guide member projecting laterally from the jack, a shank puller movable over said member, means for frictionally holding the puller in place on said member, and a fulcrum block about which the said movement of the puller takes place for stretching the upper.

39. A machine of the class described having, in combination, a jack having means for supporting the last, a shank puller operatively connected with said jack arranged to extend across the shoe bottom for engaging the upper, a fulcrum block carried by the puller for engaging the side of the last opposite to that at which the upper is seized, and means for adjusting said fulcrum block for wide and narrow lasts.

40. A machine of the class described having, in combination, a jack having means for supporting a last, a shank puller operatively connected with the jack and comprising jaws extending across the last bottom to engage the upper on one side of the shoe, a fulcrum block for engaging the other side of the shoe, means for closing the jaws, and means coöperating with said puller and jack for retaining the puller in the position to which it is moved for stretching the upper.

41. A machine of the class described having, in combination, a jack having means for supporting a last, a shank puller operatively connected with the jack and comprising jaws extending across the last bottom to engage the upper on one side of the shoe, a fulcrum block for engaging the other side of the shoe, and means for adjusting said fulcrum block toward and from the jaws for wide and narrow lasts.

42. A machine of the class described having, in combination, a jack having means for sustaining a last, shank pullers arranged upon opposite sides of the jack and each comprising a vertical stem operatively connected with the jack, a horizontal arm adapted to extend across to the opposite side of a shoe and carrying a jaw, a coöperating jaw mounted on said arm, means for actuating said jaws relatively to seize the upper, and a fulcrum block about which said stem is movable for effecting pulling of the upper.

43. An organized heel seat lasting machine having, in combination, a stationary tacker, a pivoted shoe holder, and a gripper on the shoe holder arranged to tension the upper forwardly about the heel end of the last and maintain it under tension, said holder and gripper being movable with the shoe to present the work to the operation of said tacker while maintaining the tension on the upper.

44. An organized machine having, in combination, a stationary tacker, operating mechanism therefor, and a toe gripper and a last holder which are relatively movable to stretch the upper longitudinally of the shoe and are movable together to present the shoe to the tacker for the operation of fastening the upper in stretched and adjusted position.

45. An organized machine having, in combination, means for holding a last, means for pulling an upper lengthwise of the last, said machine being so constructed and arranged that the last can be turned within the upper for making relative adjustment of the upper and last, and means for fastening the upper while it is held in pulled and adjusted position.

46. An organized machine having, in combination, means for supporting a last for movement about a single pivotal axis located in its heel portion, means for putting the upper at the two sides of the last under lengthwise forward strain and tightening it about the heel end of the last, and means for fastening the upper while it is held in the condition described.

47. An organized machine having, in combination, means for supporting a last for movement about a single pivotal axis located in its heel portion, means for pulling the upper in substantially straight lines over the top face of the toe of the last and holding the marginal portions of the upper at the sides of the last under tension, said parts being constructed and arranged to permit turning of the last laterally to vary the relative strains on the upper at the two sides of the shoe, and means arranged for operation while the upper is so held for fastening the upper.

48. An organized machine having, in combination, a tacker, a shoe holder that is movable to carry the shoe under the tacker, and a gripper on the shoe holder that is arranged to pull the upper lengthwise of the last and to move with the holder to maintain the upper under tension while it is tacked.

49. A machine of the class described having, in combination, a gripper, a tacker, operating mechanisms for said gripper and tacker, and a feeler connected with both said mechanisms and arranged for movement by the shoe to cause said mechanisms to operate.

50. A machine of the class described having, in combination, a gripper, a tacker, operating mechanisms for said gripper and tacker including power driven mechanism for the tacker, and a feeler arranged for movement by the shoe to actuate the gripper operating mechanism and to start the power driven mechanism for the tacker.

51. A machine of the class described having, in combination, a gripper, and a feeler arranged for movement by the shoe to effect closing of the gripper and then displacement of the gripper away from the shoe in a direction to tension the upper.

52. A machine of the class described having, in combination, a gripper, a feeler, and gripper operating mechanism arranged to be actuated in response to pressure of the shoe against the feeler to cause the gripper jaws to seize the upper and then to uplift the jaws to pull the upper.

53. A machine of the class described having, in combination, a gripper, a feeler, and gripper operating mechanism arranged to be actuated to seize the upper in response to backward pressure of the shoe against the feeler and having means for moving the jaws backwardly with the shoe until the jaws have seized the upper.

54. A machine of the class described having, in combination, means for supporting a last, overlaying and tacking means arranged relatively thereto to bend the flange of the upper materials including the heel stiffener over the rear end of the heel seat and fasten said materials to the shoe innersole, and means for engaging the flange of the upper materials including the wings of the heel stiffener to hold said wings from moving downwardly in response to the inward bending action of the overlaying means on the stiffener flange at the rear end of the heel seat.

55. A machine of the class described having, in combination, two grippers, operating mechanisms therefor, and a feeler through which pressure of the shoe can be caused to operate said mechanisms and which is adjustable to determine which gripper shall be operated.

56. A machine of the class described having, in combination, a tacker, a gripper arranged on each lateral side of the tacker, and means adjustable to determine which gripper shall be operative.

57. A machine of the class described having, in combination, a tacker, a gripper arranged on each lateral side of the tacker, and a feeler through which pressure of the shoe as it is moved into tack receiving position may be caused to actuate a gripper, said feeler being adjustable to determine which gripper shall be used and having provision for allowing presentation of the shoe without actuating either gripper.

58. A machine of the class described having, in combination, a tacker, a gripper arranged on each lateral side of the tacker, and a feeler through which pressure of the shoe as it is moved into tack receiving position may be caused to start the tacker and to operate either gripper alternatively to tension the upper on one or the other side of the tacking point.

59. A machine of the class described having, in combination, a tacker, operating mechanism therefor arranged to cause the tacker to wipe forwardly over a shoe bottom to lay an upper in position to be fastened and then to insert a tack, and a feeler operated by pressure of the shoe to start the tacker.

60. A machine of the class described having, in combination, a tacker, a feeler arranged to be moved by laterally directed pressure of the shoe in presenting the shoe to the tacker, and power driven mechanism arranged to be started by such pressure and caused to wipe the upper inwardly over the shoe bottom and then to fasten it.

61. An assembling and tacking machine having, in combination, a seat tacker, a heel end tacker movably supported for adjustment vertically toward and from the seat tacker, a slide controlling the elevation of the front end of the tacker, an eccentric to which the slide is connected, a handle for moving the eccentric, and friction means for retaining the parts in adjusted position.

62. An assembling and tacking machine having, in combination, upper pulling means operating by forwardly directed tension to conform the materials of the heel portion of a shoe to the contour of the heel end face of a last, and means operating to insert a tack through said materials into the heel end face of the last while said materials are held so conformed by the pulling means.

63. An assembling and tacking machine having, in combination, a shoe support, a seat tacker, a heel end tacker, and means comprising an operating member and connections therefrom to the heel end tacker for adjusting said end tacker to insert end tacks nearer to or farther from the heel seat face of the shoe, said means having a device responsive to manual control for retaining the end tacker in adjusted position.

64. A machine of the class described having, in combination, means for supporting a last, means acting to shape the upper materials including the heel stiffener to the vertical curvature of the heel end face of the last adjacent to the heel seat, and means adapted to become operative in advance of said shaping means for engaging the flange of the upper materials including the wings of the stiffener at the sides of the last to hold said wings from moving downwardly in response to the action of the shaping means.

65. A machine of the class described having, in combination, means for supporting a shoe, means operating upon the shoe and having a tendency to cause the wings or front end portions of the heel stiffener to sag downwardly along the sides of the last, and means adapted to become operative for seizing the flange portions of the stiffener wings in advance of the action of the said last-mentioned means to prevent such downward sagging.

66. A machine of the class described having, in combination, a tacker, and a pivoted shoe holder movable with the shoe to present the work to the operation of the tacker and comprising a spindle, an assembler frame provided with a gripper and carried on the spindle, a last post also carried on the spindle and having endwise sliding movement in the assembler frame, a spring for upholding the last post, and means for controlling the firmness with which the spring causes the post to uphold the shoe to the tacker.

67. A machine of the class described having, in combination, a tacker, and a pivoted shoe holder movable with the shoe to present the work to the operation of the tacker and comprising a spindle, a recessed head block fast on the spindle, a last post extending downwardly into the recess in the head block, a thimble located in the recess, a spring located in the thimble and upon which the last post rests, a cam movable in the spindle and upon which the thimble rests, and means for operating the cam to adjust the spring to control the firmness with which the shoe is upheld to the tacker.

68. A machine of the class described having, in combination, a tacker, and a pivoted shoe holder movable with the shoe to present the work to the operation of the tacker and comprising a spindle, a recessed head block fast on the spindle, a last post extending downwardly into the recess in the head block, a spring located in the recess and upon which the last post rests, and means for adjusting the spring.

In testimony whereof I have signed my name to this specification in the presence of two subscribing witnesses.

BENJAMIN F. MAYO.

Witnesses:
LAURA M. GOODRIDGE,
CHESTER E. ROGERS.

Copies of this patent may be obtained for five cents each, by addressing the "Commissioner of Patents, Washington, D. C."

Correction in Letters Patent No. 1,167,913.

It is hereby certified that in Letters Patent No. 1,167,913, granted January 11, 1916, upon the application of Benjamin F. Mayo, of Salem, Massachusetts, for an improvement in "Shoe-Assembling and Heel-Seat-Lasting Machines," an error appears in the printed specification requiring correction as follows: Page 9, line 26, claim 20, for the word "mechanisms" read *mechanism;* and that the said Letters Patent should be read with this correction therein that the same may conform to the record of the case in the Patent Office.

Signed and sealed this 9th day of May, A. D., 1916.

[SEAL.]

R. F. WHITEHEAD,

*Acting Commissioner of Patents.*

Cl. 12—5.